United States Patent [19]
Miller

[11] 3,803,489
[45] Apr. 9, 1974

[54] LIQUID CONTACTS FOR USE IN SEMICONDUCTOR DOPING PROFILE ANALYSIS

[75] Inventor: Gabriel Lorimer Miller, Westfield, N.J.

[73] Assignee: Bell Telephone Laboratories Incorporated, Murray Hill, N.J.

[22] Filed: Jan. 4, 1973

[21] Appl. No.: 320,977

[52] U.S. Cl. .......................... 324/158 D, 324/158 P
[51] Int. Cl. .......................................... G01r 31/26
[58] Field of Search ........ 324/158 D, 158 T, 158 R; 29/574

[56] References Cited

UNITED STATES PATENTS 3,605,015 9/1971 Copeland ...................... 324/158 D
2,940,024 6/1960 Kurshan ......................... 324/158 D

*Primary Examiner*—Alfred E. Smith
*Assistant Examiner*—Ernest F. Karlsen
*Attorney, Agent, or Firm*—R. B. Anderson

[57] ABSTRACT

In semiconductor doping profile apparatus of the type using current feedback for maintaining a constant modulation parameter, non-destructive analysis is achieved by using a liquid electrode rectifying contact for forming each required diode region. A metal electrode contacts the electrolyte and is surrounded by an annular guard ring, maintained at rf ground, which defines precisely the area of the diode region.

19 Claims, 5 Drawing Figures

LIQUID CONTACTS FOR USE IN SEMICONDUCTOR DOPING PROFILE ANALYSIS

This invention relates to methods and apparatus for analyzing semiconductor wafers, and more particularly, to apparatus for determining a profile of the variation of carrier density with distance in a semiconductor wafer.

An important step in the fabrication of semiconductor devices and integrated circuits is a determination of the majority carrier distribution, also known as the doping density profile, in a semiconductor wafer. Several techniques are available for making this determination, all of which require the formation of a diode region, typically by bonding a metal contact to a top surface of the wafer to form a Schottky barrier diode. In accordance with a process generally known as the "C-V technique," a varying reference bias voltage is applied across the diode region and the capacitance of the diode is measured as a function of the bias voltage. The carrier density profile is related to the capacitance and to the rate of change of capacitance with bias voltage, and is therefore determinable.

An alternative process, which may be known as the "harmonic technique," is described in the U.S. Pat. of Copeland, 3,518,545, issued June 30, 1970, and assigned to Bell Telephone Laboratories, Incorporated. The diode is reverse-biased, a constant rf current is directed to the diode, and first and second harmonic voltages across the diode are measured. It can be shown that the first harmonic voltage is proportional to the thickness of the depletion layer, while the second harmonic voltage is proportional to the reciprocal of carrier density at the outer boundary of the depletion layer. By progressively increasing the reverse-bias voltage, the outer boundary of the depletion layer can be made to scan through the wafer thickness, and the reciprocal of carrier density can be determined at successive depths in the wafer.

Still another technique, which may be referred to as the "feedback technique," is described in the patent application of G. L. Miller, Ser. No. 147,846, filed May 28, 1971, and assigned to Bell Telephone Laboratories, Incorporated. Constant current of frequency $f_1$ is applied to the diode, and the resulting diode voltage may be detected to determine the depletion layer depth $X$ as in the harmonic technique. Voltage at a low frequency $f_2$ is applied to the diode such as to produce a modulation $\Delta E_2$ of electrical field in the depletion layer, and a modulation $\Delta X_2$ of the depletion layer depth. Under these conditions, the carrier density $N$ is a function of both $\Delta X_2$ and $\Delta E_2$. Thus, carrier density $N$ may be determined at any depletion layer depth by maintaining $\Delta X_2$ constant and measuring $\Delta E_2$, or conversely, maintaining $\Delta E_2$ constant and measuring $\Delta X_2$.

In practice, one of the two modulation parameters can conveniently be maintained constant by properly feeding back a portion of the energy derived from the diode region. For example, low frequency $f_2$ voltage is controlled by the detected output of frequency $f_1$ so as to be proportional to the depletion layer $X$. It can be shown that, when the voltage at $f_2$ is proportional to $X$, the resulting electric field modulation $\Delta E_2$ is constant with changes of depletion layer depth $X$. The magnitude of the modulation at frequency $f_2$ is then indicative of the reciprocal of the carrier density $1/N$ at the edge of the depletion layer. This technique gives advantages over both the C-V and harmonic techniques as described in detail in the Miller application.

One problem with all of the foregoing techniques is that it takes a fair amount of time to form the Schottky barrier contact. After the analysis has been performed, the contacts are removed, but metal contaminants are invariably left on the wafer. The presence of these contaminants seriously limits the uses to which the wafer may be put, and in many cases, the wafer or the contaminated portion cannot be processed into finished devices.

The paper "A Mercury Contact Probe for MOS Measurements on Oxydized Silicon," by R. Hammer, *Rev. of Scientific Inst.* Vol. 41, p. 292, 1970 describes the use of a mercury contact for a metal-insulator-semiconductor diode region used in the C-V technique. Rather elaborate apparatus is required for precisely defining the liquid mercury contact area. Further, it can be shown that liquid mercury is a contaminant, and is therefore best used with metal-insulator-semiconductor configurations. However, such diodes are disadvantageous in that they can only be operated on a pulsed basis, due to the formation of surface charges within a short time after application of a reverse-bias voltage.

SUMMARY OF THE INVENTION

Accordingly, it is an object of this invention to simplify semiconductor analysis and to reduce the time and skill required for determining the doping profile in semiconductor wafers.

It is another object of this invention to reduce or eliminate the contamination of semiconductor wafers resulting from doping profile analysis.

These and other objects of the invention are achieved by using an appropriate liquid contact for forming the diode region of the semiconductor wafer to be analyzed. Specifically, a thin film of electrolyte is included between a solid electrode and the wafer surface. It is important that the electrolyte form a rectifying barrier with the wafer, that it be substantially non-contaminating, and that it be of low impedance. I have found that these conditions are met by a wafer electrolyte containing sufficient impurities to give it a resistivity of approximately $10^5$ ohm-centimeters or less. This can be done, consistent with the above conditions, in a number of ways, as for example, by using as the impurity a small amount of dilute nitric acid, or a small amount of water-soluble conducting polymers.

As will be explained later, it is important tha the area of the diode region be accurately defined, and this may be done by including an annular guard ring which surrounds the solid electrode and is insulated from it, but which contacts the electrolyte. With the guard ring maintained at rf ground but at the same dc voltage as the solid electrode, the diode region area is defined substantially by the diameter of the solid electrode. This is important for giving consistent output results as successive wafers are tested.

In accordance with the invention, the forward-biased or "back contact" to the semiconductor wafer may be formed the same way as the rectifying contact; that is, the contact may be made by way of a water electrolyte. Profiling analysis is further simplified by surrounding the solid electrode and guard ring with a large diameter annular electrode and submerging them both in the electrolyte with a common planar surface presented below the surface of the electrolyte. The wafer may then be placed over the common planar surface of the solid electrode and the surrounding annular electrode and the assembly is raised above the surface of the electrolyte to contact the wafer. In this manner, a thin film of electrolyte is formed by surface tension between the wafer and both the solid electrode and the annular electrode. The dc bias is next applied between the inner solid electrode (front contact) and the surrounding annular electrode (back contact). After the analysis is completed, the wafer is removed, dried, and is undamaged and uncontaminated by the technique. It can be appreciated that the foregoing process greatly simplifies and facilitates the analysis of semiconductor wafers.

These and other objects, features and advantages of the invention will be better understood from a consideration of the following detailed description taken in conjunction with the accompanying drawings.

DRAWING DESCRIPTION

DETAILED DESCRIPTION

Figure 1:
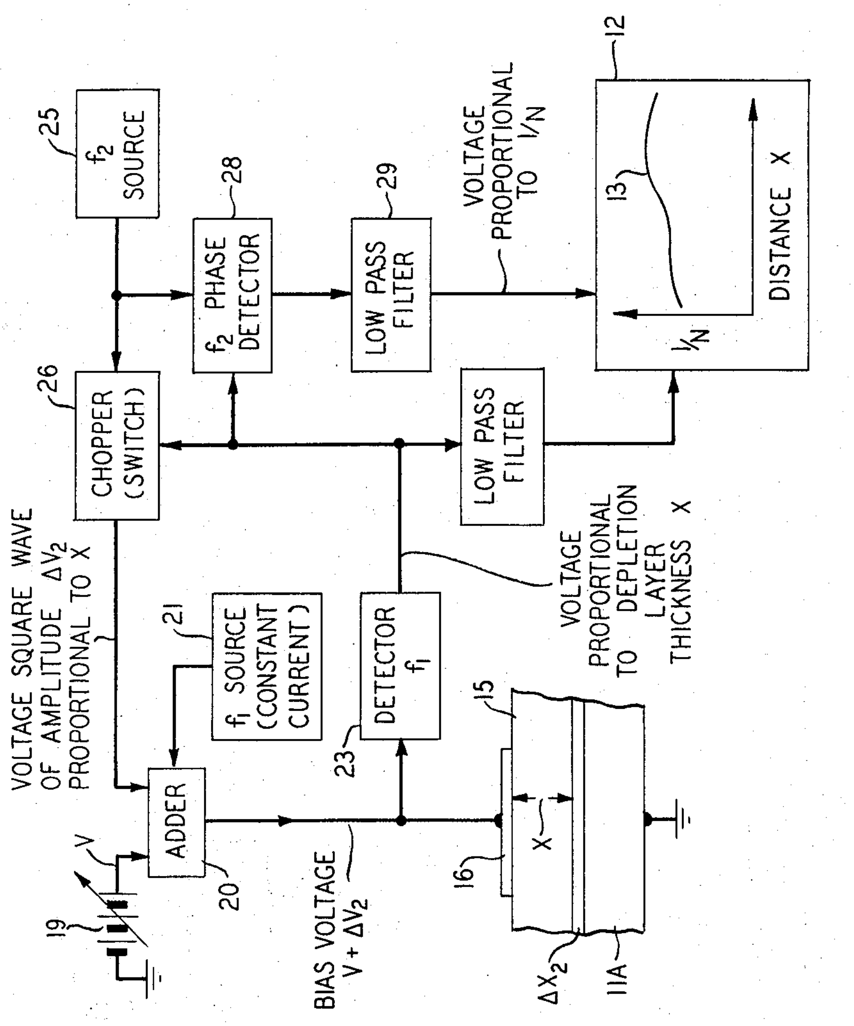
FIG. 1 (PRIOR ART)
FIG. 1 is a functional block diagram of apparatus for analyzing a semiconductor wafer in accordance with the known feedback technique of the prior art.

Referring now to FIG. 1, there is shown apparatus of the prior art for generating the doping profile of a semiconductor wafer 11A. That is, the purpose of the apparatus is to generate automatically on an *x-y* (*uc*) plotter 12 a curve 13 of the variation of the reciprocal of carrier density ($1/N$) in the wafer with respect to distance $X$. To do this, diode portion 15 is first formed on the wafer by bonding a Schottky barrier contact 16 to one surface. A reverse-bias voltage $V$ is applied to the diode 15 by a source 19 via an adder 20. Also applied to the diode is constant-current rf energy of frequency $f_1$ from a source 21.

The reverse-bias voltage creates a depletion layer beneath the Schottky barrier contact 16, and, as the bias voltage $V$ is increased, the thickness $X$ of the depletion layer increases, such that the edge of the depletion layer scans through the thickness of the wafer 11. The impedance of the diode is a function of $X$, and therefore, the voltage at frequency $f_1$ across the diode region is indicative of depletion layer thickness. A detector 23 converts the $f_1$ voltage to a dc voltage proportional to the distance $X$ for display by the plotter as shown in the drawing. This is not necessarily the preferred method of generating a dc voltage proportional to $X$, but it serves as a convenient illustration.

In accordance with the feedback technique described in the aforementioned Miller application, the voltage proportional to $X$ is also used to control the amplitude of a low frequency $f_2$ from a source 25 that is directed to the diode 15. To do this, source 25 is used to operate a switch or chopper 26, which periodically passes dc voltage from detector 23, to generate a square wave of frequency $f_2$ and an amplitude $\Delta V_2$ which is proportional to the layer thickness $X$. This square wave voltage is combined by adder 20 with the bias voltage $V$ to give a combined voltage $V+\Delta V_2$. The incremental voltage $\Delta V_2$ produces an incremental depletion layer thickness $\Delta V_2$ and an incremental electric field $\Delta E_2$ within the diode region.

By feeding back a portion of the voltage detected by detector 23, one insures that the modulation parameter $\Delta E_2$ is maintained constant. Then, for reasons given in the Miller application, the incremental distance $\Delta X_2$ depicted in the figure is proportional to the reciprocal of carrier construction $1/N$ at distance $X$. Since the incremental distance $\Delta X_2$ modulates the diode impedance, its value can be determined by measuring the magnitude of the modulation of the $f_1$ voltage across the diode at frequency $f_2$. The magnitude of the modulation of the $f_1$ signal is detected by a combination of phase detector 28 and low pass filter 29 which together generate a dc voltage proportional to the parameter $1/N$; this constitutes the $Y$ input into the *x-y* plotter 12.

After the doping profile of wafer 11 has been determined, contact 16 is typically removed and the wafer is processed to make useful devices such as transistors, integrated circuits, and the like. The problem with which the present invention is concerned is the relative difficulty of forming and removing contact 16 and its tendency to contaminate permanently wafer 11A.

Figure 2:
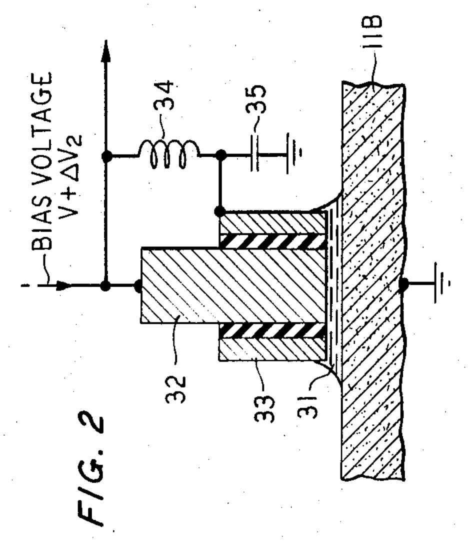
FIG. 2 is a schematic view of a liquid contact that may be used with the apparatus of FIG. 1, in accordance with the invention.

In accordance with the invention, a noncontaminating liquid electrolyte is used for forming the required diode region. Referring to FIG. 2, the liquid electrolyte 31 is sandwiched between an upper surface of the wafer 11B to be tested and a cylindrical solid electrode 32. Surrounding and insulated from the solid electrode 32 is an annular guard ring 33. The guard ring 33 is shown as being connected by an rf choke 34 to the electrode 32 and being connected through a capacitance 35 to ground. This is intended to indicate schematically that guard ring 33 is maintained at the same bias potential as electrode 32 but is at rf ground potential at all times.

In accordance with the invention, the preferred requirements of electrolyte 31 are that it provide a rectifying barrier with respect to wafer 11B, that it be substantially noncontaminating, and that it be of low impedance. Additionally, the electrolyte should be capable of transmitting a reverse-bias leakage current without the evolution of gas, since bubbling would modify the effective contact area and produce distorted results. I have found that these conditions are met by using, as the electrolyte, distilled water, which is rendered slightly conducting by the addition of a small quantity of a conductive impurity. The dielectric constant of water is extremely high, being approximately 80 at 1 megahertz, and it is completely noncontaminating.

The water should be sufficiently conducting so that the water-semiconductor interface can act essentially as a junction diode and conduct reverse-bias leakage current. If the water contact were nonconducting, the equivalent of a metal-insulator-semiconductor diode would be formed which has the recognized disadvantage of being operable only on a pulsed basis.

Accordingly, impurities should be added to the water in a sufficient amount to give the water electrolyte a resistivity on the order of $10^5$ ohm-centimeters or less. Such impurities should be noncontaminating, and I have found that water soluble polymers commercially available from the Dow Corning Company under the identification XD 7036 are admirably suited for this purpose. Specifically, I have found that the inclusion of about 2 per cent by volume of such polymers gives satisfactory results. Alternatively, the addition of a small amount of, for example, dilute nitric acid may be used to give the desired resistivity.

The surface area covered by liquid electrolyte 31 is of course inherently unpredictable. However, by placing guard ring 33 at the same dc bias potential as electrode 32,7 but at rf ground potential, the effective area of electrical contact is precisely defined. That is, for purposes of the profiling calculation, the area of the diode region is substantially equal to the cross-sectional area of solid electrode 32. The predictability and reproducibility of the contact area is plainly important for giving consistent results as successive wafers are analyzed.

A high dielectric constant of the electrolyte used is important to maximize the capacitance between electrode 32 and wafer 11B. If the rf impedance of the liquid electrolyte were not low compared to the impedance of the semiconductor depletion layer, consistent results could not conveniently be obtained due to inevitable variations of electrolyte film thickness.

Figure 3:
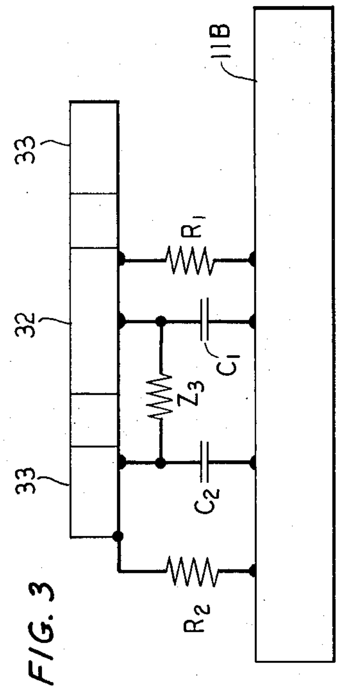
FIG. 3 is a schematic diagram of certain impedances associated with the liquid electrolyte of FIG. 2.

The various electrical requirements are summarized in FIG. 3 which shows various impedance components in the electrolyte between elements 32, 33 and wafer 11B. The resistance $R_1$ should be sufficiently low to permit reverse leakage current, and therefore to permit operation as a junction diode. The dielectric constant at the rf frequency should be high so as to minimize the impedance of $C_1$, thereby to make the impedance of the electrolyte small compared to the impedance of the diode depletion layer. Finally, the impedance $Z_3$ should be small compared to the output impedance of the rf generator driving electrode 32.

Figure 4:
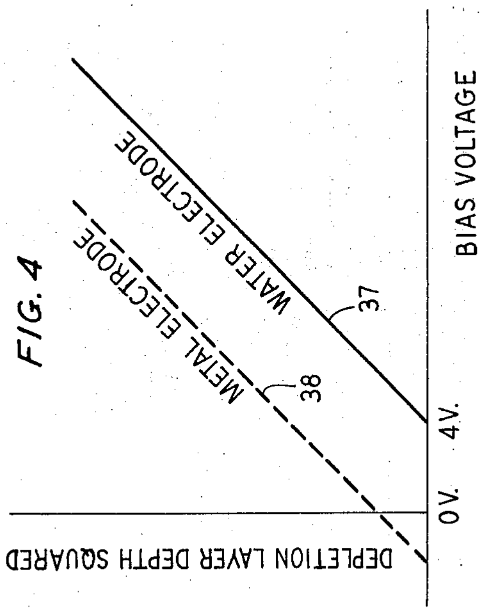
FIG. 4 is a graph of bias voltage versus depletion layer depth squared.

An additional characteristic of water as a rectifying contact should be mentioned; that is, water does not form a well-defined rectifying barrier with a silicon surface until a reverse-bias voltage of about four volts has been applied. A comparison of a water electrode with a conventional metal Schottky barrier electrode is shown in FIG. 4, in which curve 37 illustrates the variation of depletion layer depth with bias voltage using a water electrode, and curve 38 shows a similar variation using a metal electrode, both electrodes being on a silicon surface. As is familiar to those skilled in the art, curve 38 illustrates that a metal electrode creates a finite depletion layer even when no external reverse-bias voltage is applied. With the water electrode, no depletion layer is formed until four volts or more of reverse-bias voltage are applied. Because of this characteristic of the water electrolyte, the water electrode would be very difficult to use with the C-V technique; in that method, the absolute value of the bias voltage enters directly into the measurement. Complex calibration could permit it to be used with the C-V technique, but it would not be convenient.

On the other hand, the water electrode could in principle be used with either the harmonic technique or the feedback technique. However, one problem with the harmonic method configuration as described thus far is that there is no convenient method to compensate for inevitable stray capacitances between the electrode 32 and the annular guard ring 33, which would necessarily affect the results. However, these stray capacitances do not affect the results obtained by the feedback method; then, the water electrode shown in FIG. 2 is clearly best suited in conjunction with the feedback technique illustrated in FIG. 1.

In experiments conducted thus far, the water electrolyte was found to be satisfactory when used with feedback profiling apparatus having parameters consistent with those discussed in detail in the aforementioned Miller application. Experimental electrodes 32 were used having diameters of between 20 to 40 mils. The technique was found to work satisfactorily with *n* and *p*-type silicon, with gallium arsenide, and with gallium phosphide. Experiments have indicated that for reasons not yet entirely clear, the water electrolyte may not be suitable for measuring the profiles of heavily doped semiconductors. It clearly works well with semiconductors having net impurity densities of less than approximately $10^{17}$ carriers per cubic centimeter.

Figure 5:
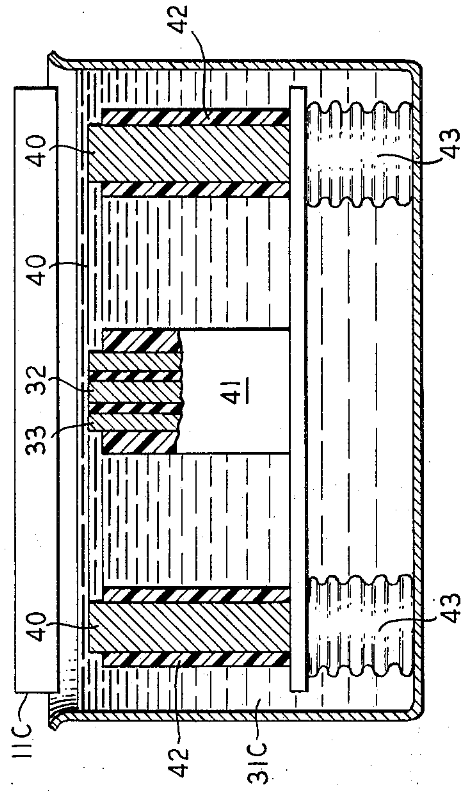
FIG. 5 is a schematic view of apparatus for making convenient liquid contacts to a wafer in accordance with another feature of the invention.

A system for further simplifying the measurement is shown in FIG. 5. The solid electrode 32 and annular guard ring 33 are surrounded by an annular back contact electrode 40. Electrode 32 and guard ring 33 are contained within a hydrophobic insulator 41, while annular electrode 40 is contained within a hydrophobic insulator 42. This assembly of insulated electrodes is mounted on a mechanical bellows 43 and submerged within an electrolyte 31C. The wafer 11C to be tested is placed above the electrolyte level and the entire electrode assembly is then raised above the surface of electrolyte 31C by the bellows 43 to contact the wafer.

At this juncture, a thin film of the electrolyte is sandwiched between the conductors and the wafer and is maintained by surface tension. Annular electrode 40 is forward-biased with respect to the wafer so as to constitute the "back contact" to the wafer; that is, with the illustrative system shown in FIG. 2, annular contact 40 is maintained at ground potential. Solid electrode 32 and annular guard ring 33 are biased as described previously to form the diode region in accordance with the invention. Insulators 41 and 42, being of hydrophobic material such as teflon, do not permit the formation of any electrolyte films by surface tension. Appropriate controls for the bellows, electrical connections to the electrodes, and other design details have been omitted in the interest of clarity.

It is apparent from FIG. 5 that large numbers of semiconductor wafers can be expeditiously analyzed by a relatively unskilled worker, and that with a water electrolyte there is little or no likelihood of wafer contamination. Another advantage of the assembly is that it eliminates the problem of rapid evaporation of the water electrolyte that has been encountered experimentally in straightforward implementations of the process illustrated in FIG. 2.

Experimental experience has shown that the use of a water electrolyte contact, in conjunction with the profiling apparatus described in the aforementioned Miller case, vastly improves and expedites the accurate measurement of doping profiles in semiconductor wafers. From the foregoing it is clear that the disclosed liquid contact could be used in conjunction with other profiling techniques, but that certain problems at the present stage of development of the invention do not occur when such uses are made.

Numerous other embodiments and modifications may be made by those skilled in the art without departing from the spirit and scope of the invention.

What is claimed is:

1. In apparatus for analyzing semiconductor wafers comprising means for forming a diode region on the wafer, means comprising a steady dc voltage source for reverse-biasing the diode region, thereby to form a stable depletion layer, means for adjusting the reverse-bias voltage to adjust the thickness of the depletion layer, and means for directing rf current through the diode region to determine doping densities at various depths in the wafer, the improvement wherein:

the diode region forming means comprises a liquid electrolyte included between a solid electrode and a first surface of the wafer;

said electrolyte being of a material that is substantially noncontaminating and nondestructive with respect to the semiconductor wafer material, whereby wafer analysis may be accomplished without damaging the wafer.

2. The improvement of claim 1 wherein:

the electrolyte comprises water including an impurity which is sufficiently conductive to impart to the water electrolyte a resistivity of approximately $10^5$ ohm-centimeters or less.

3. The improvement of claim 2 wherein:

the electrolyte consists of water containing approximately two percent by volume of a water-soluble conducting polymer.

4. The improvement of claim 1 further comprising:

means for defining the area of the diode region comprising an annular conductive guard ring surrounding the solid electrode and insulated therefrom, and being in contact with the liquid electrolyte.

5. The improvement of claim 4 wherein the reverse-bias means comprises means for maintaining the solid electrode and the guard ring at substantially the same dc voltage;

the rf current-directing means comprises means for directing rf current through the solid electrode; and further comprising:

means for maintaining the guard ring at rf ground voltage.

6. The improvement of claim 5 wherein:

the electrolyte comprises water including an impurity which is sufficiently conductive to impart to the water electrolyte a resistivity of approximately $10^5$ ohm-centimeters or less.

7. The improvement of claim 5 wherein:

the reverse-biasing means comprises an annular electrode contacting the same wafer surface as the solid electrode and the guard ring, the annular electrode surrounding the guard ring and being biased at a dc voltage with respect to the solid electrode.

8. The improvement of claim 7 further comprising:

means for submerging both the annular electrode and the solid electrode in the electrolyte;

and means for raising the annular electrode, solid electrode and guard ring from the electrolyte so as to contact the wafer, whereby a thin film of the electrolyte constitutes an electrical interconnection between the wafer and both the solid and annular electrodes.

9. The improvement of claim 8 wherein:

the electrolyte comprises water including an impurity which is sufficiently conductive to impart to the water electrolyte a resistivity of approximately $10^5$ ohm-centimeters or less.

10. The improvement of claim 9 wherein:

the electrolyte consists of water containing approximately two percent by volume of a water soluble conducting polymer.

11. In a process for analyzing semiconductor wafers comprising the steps of forming a diode region on the wafer, reverse biasing the diode region thereby to form a depletion layer, adjusting the reverse bias voltage to adjust the thickness of the depletion layer, and directing rf current through the diode region to determine doping densities at various depths in the wafer, the improvement wherein:

the step of forming the diode region comprises the steps of contacting a liquid electrolyte to one exposed surface of the semiconductor wafer and contacting a solid electrode to the electrolyte;

and the step of directing rf current through the diode region comprises the step of directing rf current through the solid electrode, the liquid electrolyte and the wafer, whereby wafer analysis may be accomplished without damaging the wafer.

12. The improvement of claim 11 further comprising the step of:

defining the area of the diode region comprising the step of contacting the liquid electrolyte with an annular conductor which surrounds the solid electrode and is insulated therefrom.

13. The improvement of claim 12 wherein:

the step of reverse biasing the diode region comprises the step of maintaining the solid electrode and the annular conductor at substantially the same dc voltage;

and the step of directing rf current comprises the step of maintaining the annular conductor at a substantially constant rf reference voltage.

14. The improvement of claim 13 wherein:

the step of forming the diode region comprises the step of including on a wafer surface an electrolyte comprising water including an impurity which is sufficiently conductive to impart to the water electrolyte a resistivity of approximately $10^5$ ohm-centimeters or less.

15. The improvement of claim 14 further comprising the steps of:

forming an annular electrode which surrounds both the annular conductor and the solid electrode;

submerging the annular electrode, annular conductor and solid electrode in the electrolyte such that the annular electrode, annular conductor and solid electrode all have a surface lying substantially on a common plane beneath the surface of the electrolyte;

raising the solid electrode, annular conductor, and annular electrode to a location above the surface of the electrolyte, thereby contacting the wafer with a thin film of the electrolyte which constitutes the electrical interconnection between both the solid and annular electrodes and the wafer.

16. In a process for analyzing a semiconductor wafer comprising the steps of forming a diode region in the wafer, successively applying different values of reverse bias voltage to the bias region, thereby forming successive depletion layers of different depth, applying a substantially constant rf current of frequency $f_1$ to the diode region, detecting the voltage across the diode region at frequency $f_1$, said voltage being indicative of the depletion layer depth, applying a voltage of frequency $f_2$ to the diode region, said frequency $f_2$ being small compared to $f_1$, said $f_2$ voltage resulting in a modulation parameter $\Delta X_2$ equal to the variation in depletion layer depth and a modulation parameter $\Delta E_2$ equal to the variation of electric field in the depletion layer, maintaining one of the modulation parameters substantially constant with changes of depletion layer depth $X$, and detecting the modulation of the $f_1$ signal at frequency $f_2$ for different values of bias voltage, thereby to analyze the diode region at different depths, the improvement wherein:

the step of forming the diode region comprises the steps of contacting a liquid electrolyte to one surface of the wafer and contacting a solid electrode to the electrolyte;

and the step of directing rf current through the diode region comprises the step of directing rf current through the solid electrode, the liquid electrolyte and the wafer, whereby the wafer analysis may be accomplished without damaging the wafer.

17. The improvement of claim 16 further comprising the step of:

contacting the liquid electrolyte with an annular guard ring which surrounds the solid electrode and is insulated therefrom;

maintaining the solid electrode and the guard ring at substantially the same dc voltage;

and maintaining the guard ring at rf ground.

18. The improvement of claim 17 wherein:

the liquid electrode comprises water including an impurity which causes it to have a resistivity of approximately $10^5$ ohm-centimeters or less.

19. The improvement of claim 18 further comprising the steps of:

forming an annular electrode which surrounds both the guard ring and the solid electrode;

submerging the annular electrode, annular conductor and solid electrode in the electrolyte such that the annular electrode, annular conductor and solid electrode all have a surface lying substantially on a common plane beneath the surface of the electrolyte;

placing the wafer at a location above the common planar surface of the electrodes;

and raising the solid electrode, annular conductor and annular electrode to contact the wafer, whereby a thin film of the electrolyte constitutes an electrical interconnection between both the solid and annular electrodes and the wafer.

* * * * *

UNITED STATES PATENT OFFICE
CERTIFICATE OF CORRECTION

Patent No. 3,803,489 Dated April 9, 1974

Inventor(s) Gabriel L. Miller

It is certified that error appears in the above-identified patent and that said Letters Patent are hereby corrected as shown below:

Column 1, at top of column, insert the heading --Background of the Invention--. Column 2, line 38, change "of" to --on--. Column 2, line 44, change "wafer" to --water--. Column 2, line 51, change "tha" to --that--. Column 3, line 41, delete "(uc)". Column 4, line 8, change "$\Delta V_2$" to --$\Delta X_2$--.

Column 4, line 15, change "construction" to --concentration--. Column 5, line 14, after "32" delete "7". Column 6, line 67, delete "not".

Signed and sealed this 3rd day of September 1974.

(SEAL)
Attest:

McCOY M. GIBSON, JR.
Attesting Officer

C. MARSHALL DANN
Commissioner of Patents